United States Patent [19]

Saada et al.

[11] Patent Number: 4,549,075

[45] Date of Patent: Oct. 22, 1985

[54] METHOD FOR CERTIFYING THE ORIGIN OF AT LEAST ONE ITEM OF INFORMATION STORED IN THE MEMORY OF A FIRST ELECTRONIC DEVICE AND TRANSMITTED TO A SECOND ELECTRONIC DEVICE, AND SYSTEM FOR CARRYING OUT THE METHOD

[75] Inventors: Charles Saada, Saint Cloud; Jean Mollier, Bougival, both of France

[73] Assignee: Cii Honeywell Bull (Societe Anonyme), Paris, France

[21] Appl. No.: 505,975

[22] Filed: Jun. 20, 1983

[30] Foreign Application Priority Data

Jul. 8, 1982 [FR] France ............... 82 12021

[51] Int. Cl.$^4$ .............................. G06K 5/00
[52] U.S. Cl. ................... 235/380; 178/22.08; 235/492; 340/825.34
[58] Field of Search ............... 235/380; 340/825.34; 178/22.08

[56] References Cited

U.S. PATENT DOCUMENTS

| 3,798,605 | 3/1974 | Feistel | 178/22.08 X |
| 4,193,061 | 3/1980 | Zoltai | 340/825.34 X |
| 4,219,151 | 8/1980 | Haruki | 235/380 X |
| 4,304,990 | 12/1981 | Atalla | 235/380 |

Primary Examiner—David L. Trafton
Attorney, Agent, or Firm—Kerkam, Stowell, Kondracki & Clarke

[57] ABSTRACT

The object of the invention is a process for certifying the origin of at least one item of information stored in the memory of a first electronic device such as a portable card and transmitted to a second electronic device such as a portable card, and a system for implementing said process. An individual A controls a card $C_A$ which has a memory $M_A$ that contains an item of information $I_A$ specific to the individual A. An individual B controls a card $C_B$ which has a memory $M_B$ that contains an item of information $I_B$ specific to individual B. In order for individual B, who receives the information $I_A$, to be certain of the origin of this information $I_A$, each of the two cards $C_A$ and $C_B$ calculates a result R related to the information $I_A$, to a secret set (S) shared by the two cards, to a random number ($E_B$) supplied by individual B, and to a parameter J which, in turn, is related to the two items of information ($I_A$, $I_B$) which are combined in accordance with a predetermined symmetrical algorithm p. The invention applies in particular to mutual identification and certification between two individuals of the same group who have been issued individual cards. Each individual of the group is issued his own personal card.

7 Claims, 1 Drawing Figure

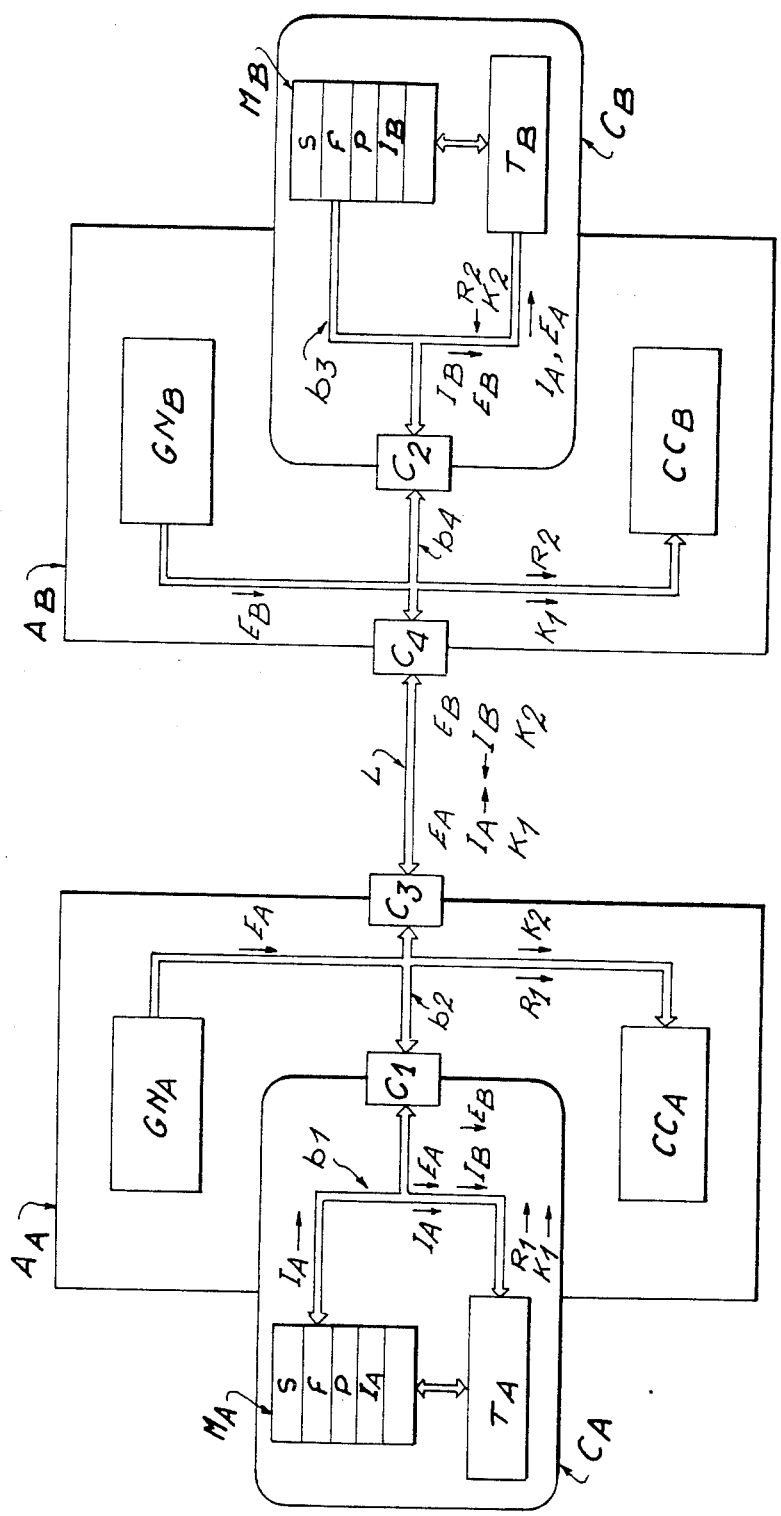

METHOD FOR CERTIFYING THE ORIGIN OF AT LEAST ONE ITEM OF INFORMATION STORED IN THE MEMORY OF A FIRST ELECTRONIC DEVICE AND TRANSMITTED TO A SECOND ELECTRONIC DEVICE, AND SYSTEM FOR CARRYING OUT THE METHOD

BACKGROUND OF THE INVENTION

1. Field of the Invention

The invention is generally concerned with the problems relating to the checking and the validity of information transmitted by means of an electronic device having at least one memory in which said information is stored, and more particularly a process for certifying or authenticating the origin of at least one item of information stored in the memory in a first electronic device and transmitted to a second electronic device, and a system for carrying out the process.

2. Description of the Prior Art

The popularity of data communications has created a new problem, i.e. how to recognize an individual or card bearer, remotely or locally, by a correspondent or business representative who does not know the individual personally, or by a data processing system to which an individual wishes to address via a terminal.

The rise of importance of data communications in the business and banking communities has been enhanced by the acceptance of electronic fund transfer terminals and the appearance of portable and removable electronic carriers such as credit cards and the like that include a microprocessor and a protected nonvolatile memory. The popularity and acceptance of these cards have provided only a glimpse of a vast field of applications and the upcoming opportunities of use directed in particular toward the public at large.

Because of the ability to personalize these cards through information previously stored in their memories, it has been possible to devise and to perfect systems that enable persons or systems to access terminals and to carry out protected operations or transactions. Among the various applications, those that readily come into mind include access to services of any kind such as, for example, access to protected premises or enclosures, data communications services, data banks, bank services, etc.

Generally speaking, all these applications give rise to an exchange of information in the form of a dialogue initiated, for instance, on a non-limitative basis, either (a) between at least one card controlled by a natural person or a corporation, and a system devised to render a given service or to give access to a protected data;

(b) between two cards, controlled, respectively, by two natural persons and/or corporations; or (c) between two data processing systems.

From the instant when there is a need to exchange information, particularly confidential information, it is imperative to initiate checks that generally verify the proof that a card belongs to its holder, the identity of the correspondents, the validity of the information transmitted or exchanged. That is, it is necessary to ensure that the user is an authorized user and that the information exchanged is valid or correctly received. It goes without saying that these checks are related to all applications in which such electronic cards are used and that they are all the more imperative because of the possibility of fraud with respect to protected access or protected service. Experience has shown that even the most sophisticated codes can be and frequently are broken to gain acccess to protected areas or devices.

Indeed, a card holder who presumably is charged for the services obtained through his card will more or less be induced to ask himself questions like;

(a) Is it not possible with my card to gain access to services to which I normally have no access, i.e., unauthorized access to other areas;

(b) Is it not possible, in the case of a payable service, to gain access to this service free of charge, i.e. to circumvent the scheme, e.g. access to a pay T.V. channel for which no subscription fee has been paid;

(c) Is it not possible to use somebody else's card instead of mine or will somebody be able to use my card?

These questions raise the problem of the degree of safety and inviolability of card systems.

SUMMARY OF THE INVENTION

The main object of the invention is to provide a solution that unerringly checks the origin of an item of information transmitted through a card, that is to say, a solution which discloses any interference by an imposter in the transmission system tending to alter the transmitted information. Therefore, this solution enables one to certify that an item of information received indeed comes without any alteration from a given card where it has necessarily been written previously, usually permanently, particularly in a protected zone of the card's memory.

To understand the solution in accordance with the present invention, it may be advantageous to elaborate on the prior art systems in greater detail, so as to provide a comparative basis by which to demonstrate the improvements provided by the subject invention.

A previous solution consists in performing a check which is essentially based on the recognition of identities or rights represented by previously recorded information in protected areas of the memory of a card supplied to a person duly authorized to use the system. This recognition also consists in using random and fugitive or transitory keys in order to prevent an impostor from reproducing a sequence of a previous dialogue between an authorized user and a system dispensing a service, said sequence having permitted lawful access to a protected enclosure or to a service through use of the user's card. Such a solution is particularly described in French Patent No. 2 469 700 of the applicant entitled "Process and System for Identifying Persons Requesting Access to Certain Circles". This system is referred to as the "TELEPASS" system, TELEPASS being a registered trademark of the assignee of the present invention. A "TELEPASS" brochure describing the system is attached as Appendix A of this application and is incorporated herein by reference.

This aforenoted patent describes a process which permits one to certify services, such as information retrieval services dispensed through associated terminals. In this system, an item of information I is certified to be present in the card connected thereto, but on condition that the service itself holds this same information I. The card has at least one non-volatile memory and electronic processing circuits such as a microprocessor. In protected areas of the card's memory there are stored at least:

(a) one item of information I representing an identity or a right to access;

(b) a secret set S only known to the transmitting duly authorized system (only the individuals whose cards have the same secret set and who thus form part of the same group can communicate between each other); and (c) an algorithm f only known to the card manufacturer. Within the information retrieval service with which the card communicates, there are also provided processing circuits and at least one memory in which there is stored at least the same information as that recorded in the card's memory.

The problem at hand is identified by the following question: How can the information retrieval service be certain that an item of information I presented to it indeed comes from the card?

This certification of information I takes place after a dialogue has been initiated between the information retrieval service and the card, which dialogue occurs in the following manner:

(a) the information retrieval service reads the information I to be certified (I being, for example, a code that identifies the bearer or holder of the card) and previously written into the card memory;

(b) the information retrieval service verifies that it has itself this information I that has previously been stored in a file containing the identities or rights of all the persons likely to have access to the service rendered by this information retrieval service;

(c) if the information I is retrieved from the file of the information retrieval system, the latter, by means of a random number generator, sends a random number E to the card;

(d) the card and the information retrieval service calculate a result R by means of their respective processing circuits, said results coming from the operation of the same algorithm f which takes account of the following parameters: I (information to be certified), E (the aforesaid random number), and S (the aforesaid secret set);

(e) the card transmits its result R to the information retrieval service which compares it with the result it has calculated itself; and (f) if there is agreement between the two results R, the information retrieval system can certify that the information I is indeed present in the card.

There is agreement between the two results R if the card and the information retrieval system possess the same secret set S and the same algorithm f, and if the information I of the card is contained in the file of the information retrieval service.

In this system, an impostor, who normally does not have access to a given information retrieval service can simulate a plausible dialogue with the information retrieval service he might be able to access the system to obtain the service. The only information accesible from the outside is the information I which is to be certified, that random number E, and the result R calculated by the card. The imposter will thus be tempted to send to the information retrieval service an item of identifying information $I_X$ of an individual X who might belong to the same group as he and of whom he knows that it is recorded in the file of the information retrieval service. In these conditions, the individual A who holds a card that identifies him through an item of information $I_A$ will manage to transmit to the information service the information $I_X$ of the individual X in lieu of the information $I_A$ contained in his card. The information retrieval service will indeed retrieve this information $I_X$ from its file, send a random number E to the card of the individual A so that the latter can calculate the result R. This result R will automatically be different from the result computed by the information retrieval service, since the calculation of R within the card of the individual A takes account of the identifying information of this card, namely, the information $I_A$, whereas the information retrieval service takes account of the information $I_X$. In these conditions, the impostor will have to substitute the result R calculated by the information retrieval service for the result R normally calculated by his card. To do this, he must be able to determine this result R in advance. This is impossible, because the imposter does not know the algorithm f and the secret set S of his card.

However, it is not out of the question that the impostor can produce an accurate result R, although it is not very likely. To increase the security of the system still further, it suffices not to transmit the identifying information I between the card and the information retrieval service, but solely one address which will enable the information I that is to be certified to be retrieved from the file of the information retrieval system. Thus, if the impostor alters this address, the information addresed in the file of the information retrieval service will necessarily be different from the identifying information contained in the card; this will give different results R within the card and within the information retrieval service. Obviously, this improvement is only possible if the file is kept perfectly secret.

In summary, such a system offers a high degree of security against attempts of fraud. However, this system necessarily calls for the information I which is to be certified to be present concurrently within the card and within the information retrieval service. Moreover, this system only provides for identification in one direction only, because there is only one subordinate relationship between the card and the information retrieval service. Indeed, the card must prove its identity or rights to the information retrieval system, that is to say, there is no mutual identification between the card and the information retrieval service.

Depending on the applications under consideration, the aforesaid file can take dimensions that go beyond the authorized memory space. This will be the case when there is no longer a dialogue between a card and an information retrieval service, but a dialogue between two cards, since the available memory space in a card will then be limited. In these conditions, an individual A will hold in his card a specific or identifying item of information $I_A$, and a second individual B will have in his card an item of specific or identifying information $I_B$. This causes the following problem. How will these two correspondents be able to transmit these items of information as certified information, given the fact that the card of individual B does not contain the information $I_A$ and the card of individual A does not contain the information $I_B$?

The aforenoted TELEPASS system cannot solve this problem. For example, the card of individual A is coupled to a linkup device hereinafter referred to as automaton $A_A$, the card of individual B is coupled to another, similar, linkup device or automaton $A_B$. The two linkup devices are connected together by a conventional transmission channel.

The card of individual A contains an item of information $I_A$ which is to be certified, a secret set S, and an algorithm f, while the associated automaton $A_A$ includes a random number generator and a comparator circuit. The card of individual B contains an item of information $I_B$ which is to be certified, the same secret set S, the same algorithm f, whereas its associated automaton $A_B$ also includes a random number generator and a comparator circuit. The two individuals A and B necessarily belong to the same group, a characteristic that can be recognized by the fact that they possess in their cards the same secret set S. Obviously, if the two individuals A and B form part of two different groups, no identification is possible. The dialogue between the two cards of the two individuals A and B is as follows, assuming that individual A wishes to pass for individual B.

(1) The automaton associated with the card of individual A reads in the card the information $I_A$ which is to be certified (identity of individual A) and transmits this information $I_A$ to the automaton $A_B$ associated with the card of individual B, as well as a random number $E_A$;

(2) In response, the linkup automaton $A_B$ transmits to automaton $A_A$ the information $I_B$ which is to be certified (identity of individual B) which is read in the card of individual B, and a random number $E_B$;

(3) The automatons $A_A$ and $A_B$ request each of the cards of individuals A and B to calculate a result which corresponds to operation of the same algorithm f which takes account of the following parameters $I_A$, $E_B$ and S, that is to say, $K_1$, the result calculated by the card of individual A and $R_2$, the result calculated by the card of individual B;

(4) The automaton $A_A$ associated with the card of individual A transmits the result $K_1$ to the automaton $A_B$ coupled to the card of individual B;

(5) The comparator circuit of automaton $A_B$ associated with the card of individual B then compares the results $K_1$ and $R_2$.

Even if there is agreement between the two results $K_1$ and $R_2$, it will be shown below that individual B cannot, for all that, certify that the information $I_A$ indeed comes from the card $C_A$ with which he communicates.

Individual A will also want to verify the information $I_B$ of individual B. To do this, the card of individual A will calculate a result $R_1$ by operating on the algorithm f which takes account of his own identity $I_A$, the random number $E_A$ transmitted by his linkup automation, and the secret set S. The card of individual B, in turn, will calculate a result $R_2$, taking account of the same parameters. Then, the automaton $A_B$ associated with the card of individual B will send its result $K_2$ to the comparator circuit of the automaton $A_A$ associated with the card of individual A in order to compare this result $K_2$ with the result $R_1$.

As previously, the agreement between the two results $R_1$ and $K_2$ does not permit individual A to infer that the received information $I_B$ indeed comes from the card $C_B$ with which he communicates.

As a matter of fact, it is entirely possible for individual A to pass for an individual X with respect to an individual B, if these three individuals belong to the same group.

Suppose that individual A wants to pass for individual X with respect to individual B. In these conditions, he transmits to the automaton $A_B$ associated with the card of individual B the information $I_X$ specific to individual X. The automaton $A_B$ associated with the card of individual B then sends the identity $I_B$ and a random number $E_B$ to the automaton $A_A$ of the card of individual A and requests the card of individual B to calculate a result $R_2 = f(E_B, S, I_X)$. The card of individual A then calculates a result $K_1 = f(E_B, S, I_A)$. Then, the automaton $A_B$ associated with the card of individual B requests the result $K_1$ calculated by the card of individual A. These results will automatically be different, because the result calculated within the card of individual A necessarily takes account of the identity $I_A$ contained in his card, whereas the result calculated within the card of individual B will take account of the information transmitted by the card of individual A, i.e., the information $I_X$ which is substituted by the impostor for his own identifying information $I_A$. In these conditions, the impostor must substitute for the result calculated by his card the result calculated by the other card. Therefore, he must determine this result in advance. This is entirely possible because all he has to do is to reenter in his card the identification $I_B$ in lieu of the identification $I_B$ sent by the card of individual B to cause a result R to be calculated, taking account of said identity $I_X$, and to send this result to the card of individual B.

Thus, individual B cannot be certain of the origin of information $I_A$ and, conversely, the same is true for individual A, since a fraudulent intervention is possible in the transmission system connecting the two cards, particularly within automatons.

The invention aims to overcome this drawback by permitting individual B to precisely certify the information $I_A$ transmitted by means of the card of individual A, and by permitting individual A to certify the origin of an item of information $I_B$ transmitted by means of the card of individual B, knowing that the card of individual A does not contain information $I_B$ and that the card of individual B does not contain information $I_A$. Put differently, each correspondent will say not only through his card something to the other correspondent, but each correspondent will also have at his disposal a means of verifying that what he receives is true and unaltered at the time of transfer from the card of the other correspondent.

With this in mind, the invention proposes a process for certifying the origin of at least one item of information $I_A$ stored in the memory in a first electronic device $C_A$ held by an individual A. Information $I_A$ is specific to individual A and is transmitted for certification to a second electronic device or card $C_B$ held or controlled by an individual B. At least one specific item of information previously stored in the memory $M_B$ in the second electronic device $C_B$.

The process comprises the steps of:

causing to be calculated within each electronic device $C_A$, $C_B$ a result R calculated by the same predetermined secret algorithm and taking account of the same predetermined secret set S and the same random number $E_B$ supplied by the second electronic device $C_B$;

comparing, within the second device $C_B$, the two results R, the agreement or identity between these two results R certifying to individual B that the first device $C_A$ forms part of the same group as his device $C_B$ owing to the fact that the two devices contain the same secret set S and the same algorithm f;

causing the algorithm f to take account of a supplementary parameter J which, in turn, takes account of the two items of information $I_A$, $I_B$ combined in accordance with the same predetermined secret algorithm p and exchanged between the two devices $C_A$, $C_B$; and thus causing the first device $C_A$ to calculate a result $R = f(E_B, S, J)$ with $J = p(I_A, I_B)$ and the second device to calculate a result $R=f(E_B, S, J)$ with $J=p(I_B, I_A)$, the algorithm p being symmetrical so that $J=p(I_A, I_B)=p(I_B, I_A)$, such that individual B, in case of an agreement between these two results R, can certify that the information $I_A$ has not been altered during its transfer between the two electronic devices ($C_A$, $C_B$).

It goes without saying that this same process can also be applied so that individual A, in turn can certify the origin of any information transmitted through the card of individual B. The invention thus permits a mutual identification between two individuals of the same group without requiring the card of one individual to contain all the information specific to all the individuals of the group with whom he can communicate.

The fundamental advantage of this process is that it does not permit one individual of a group to pass for an individual who also belongs to this same group vis-a-vis another individual of this same group, even if a fraudulent intervention occurred on the transmission system between the two cards.

BRIEF DESCRIPTION OF THE DRAWING

Other features, advantages and details will become apparent from the explanatory description given below, reference being had to the accompanying drawing given solely by way of example and in which is schematically represented one system for carrying out this process.

DESCRIPTION OF THE PREFERRED EMBODIMENT

In the example illustrative of the subject invention, electronic devices are deemed to be conveniently portable such as cards of the credit card type adapted for removable electronic interconnection with a terminal or transaction device.

Referring to the drawing, assume individual A has a card $C_A$ and an individual B has a card $C_B$.

The card $C_A$ of individual A comprises at least:
one non-volatile memory $M_A$ in which are stored: one item of information $I_A$ specific to individual A, one secret set S identifying the group to which individual A belongs; one predetermined secret algorithm f, and one predetermined secret algorithm p; and processing circuits $T_A$ in the form of a microprocessor.

The card $C_B$ of individual B also includes one memory. $M_B$ containing the same information as that of the memory $M_A$ of the card $C_A$, the sole difference being that the information $I_A$ is replaced by an item of information $I_B$ which is specific to individual B; and processing circuits $T_B$ also in the form of a microprocessor.

The two cards $C_A$ and $C_B$ can be connected as follows: Individual A couples his card $C_A$ to a linkup device or terminal hereinafter called automaton $A_A$ by means of a coupling interface $C_1$. This automaton comprises a random number generator GNA and a comparator circuit $CC_A$. The various elements included in the card $C_A$ are connected by a bus $b_1$, whereas the constitutent elements of the automaton $A_A$ are connected by a connecting bus $b_2$.

The card $C_B$ of individual B is coupled in identical manner to a linkup device or terminal referred to as an automaton $A_B$ by means of a coupling interface $C_2$. This automaton $A_B$ comprises at least one random number generator GNB and a comparator circuit CCB. The constituent elements of the card $C_B$ are interconnected by means of a bus $b_3$, whereas the elements of the automaton $A_B$ are connected together by a bus $b_4$.

Finally, the two automatons $A_A$ and $A_B$ are interconnected by a transmission channel L, the form of which is well known in the prior art. Channel L is connected to the automaton $A_A$ by means of a coupling interface $C_3$, and to the automaton $A_B$ by means of coupling interface $C_4$. Let us suppose at the outset that individual A, holder of the card $C_A$, desires to communicate with individual B, holder of the card $C_B$. Once these two cards are interconnected by means of the automatons $A_A$, $A_B$ and the transmission channel L, the dialog between the two individuals A and B, through their cards $C_A$ and $C_B$, is established as follows:

(1) the automaton $A_A$ coupled to the card $C_A$ of individual A sends to the automaton $A_B$ coupled to the end $C_B$ of individual B the information $I_A$ which is previously stored in the memory $M_A$ of the card $C_A$;

(2) the card $C_B$ of individual B cannot certify the origin of the information $I_A$ because it does not have a previously established file from which it can retrieve the information $I_A$; in these conditions, the automaton $A_B$ coupled to the card $C_B$ sends, in response to the query from automaton $A_A$, a random number $E_B$ which is supplied by the random number generator GNB of the linkup automaton $A_B$, and the information $I_B$ specific to individual B;

(3) each card $C_A$, $C_B$ then calculates a result $R=f(E_B, S, J)$ with $J=p(I_A, I_B)$ for the card $C_A$ (let $K_1$ be this result) and with $J=p(I_B, I_A)$ for the card $C_B$ (let $R_2$ be this result). The algorithm p always takes as the first parameter the information specific to the card which performs the calculation, and as the second parameter the information received from the other card;

(4) as individual B seeks to certify the origin of information $I_A$, the automaton $A_B$ coupled to the card $C_B$ of the individual B will first request the result $K_1$ calculated by the card $C_A$ by means of the random number $E_B$;

(5) this result $K_1$ transmitted by the automaton $A_A$ coupled to the card $C_A$ is compared with the result $R_2$ in the comparator circuit CCB of the automaton $A_B$ coupled to the card $C_B$ of individual B.

Assuming that individuals A and B were authorized users and not seeking to commit a fraud on the transmitted information and, since the algorithm p is, according to one essential characteristic of the invention, a symmetrical algorithm such as $J=p(I_A, I_B)=p(I_B, I_A)$, the two calculated results $K_1$ and $R_2$ will be identical.

If the two results $K_1$ and $R_2$ are identical, individual B will be assured since on the one hand, the card $C_A$ of individual A has the same secret S as his card $C_B$, that is to say, that the two cards form part of the same group; and on the other hand, that the information $I_A$ indeed comes from the card $C_A$.

Assuming that the card $C_B$ forms part of a data processing system or information retrieval service which is capable of supplying a service the moment it is certain to certify the origin of an item of information transmitted by means of a card connected to said information retrieval service. In these conditions, the system according to the invention permits identification in one direction with a high degree of security.

However, the system according to the invention also allows mutual identification between the two individuals A and B in question. To do that, once individual B has certified the origin of the information specific to individual A, the latter must ascertain that he indeed communicates with individual B. To that end, the automaton $A_A$ coupled to the card $C_A$ of individual A sends, for example, concurrently with the information $I_A$, a random number $E_A$, and the card $C_A$ calculates a result $R_1 = f(E_A, S, J)$ with $J = p(I_A, I_B)$ whereas the card $C_B$ calculates a result $K_2 = f(E_A, S, J)$ with $J = p(I_B, I_A)$.

The comparator $CC_A$ of the automaton $AA$ connected to the card $C_A$ of individual A then compares the two results $R_1$ and $K_2$. If there is agreement between these two results, individual A will be able to certify the origin of information $I_B$.

Such a system offers considerable security. To convince oneself of that, one only has to simulate an attempt at fraud. Suppose that individual A, with his card $C_A$, wants to pass for individual X vis-a-vis an individual B, these three individuals A, X, and B belonging to the same group.

Individual A or the impostor, will substitute for his specific information $I_A$, such as his identity stored in his card, the identity $I_X$ which identifies the individual X and send via the automaton $A_A$ said identity $I_X$ to the card $C_B$ of individual B.

As previously noted, the automaton $A_B$ coupled to the card of individual B, in turn, sends the identity $I_B$ and a random number $E_B$. The two cards $C_A$ and $C_B$ each calculate a result $R = f(E_B, S, J)$ with $J = p(I_A, I_B)$ for the card $C_A$ (let $K_1$ be this result) and with $J = p(I_B, I_X)$ for the card $C_B$ (let $K_2$ be this result). The automaton $A_B$ coupled to the card $C_B$ of individual B then requests the result $K_1$ calculated by the card $C_A$ in order to compare it with the result $R_2$ calculated by the card $C_B$.

If the impostor will merely communicate the information $I_X$ in lieu of his true identity $I_A$, the two results R calculated by the two cards $C_A$ and $C_B$ will necessarily be different, since the two parameters J within both cards $C_A$ and $C_B$ are different from one another.

Therefore, the impostor will seek to determine in advance the result calculated by the card $C_B$ once the false identity $I_X$ is communicated to the latter. Also, it is necessary that the impostor substitute for the information $I_B$ communicated to his card $C_A$ by the card $C_B$ an item of information $I_W$ such as $J = p(I_A, I_W) = p(I_B, I_X)$ so that his card $C_A$ calculates the same result as the card $C_B$.

This is impossible, because individual A, or the impostor, does not know the algorithms f and p. Similarly, individual B will not be able to make individual A believe that he is another individual X of the same group as he.

Supposing that individual A, through an indiscreet action, knows the algorithm p, he can then calculate the parameter $J = p(I_B, I_X)$ in advance, and therefore know the value $I_W$. To avoid this, the algorithm p is preferably a trap, i.e., a one-way, algorithm, so that even if the result J and the parameter $I_A$ are known, the parameter $I_W$ cannot be determined. Furthermore, the algorithm p may take account of a supplementary parameter $E_X$, which is a predetermined combination of the two random numbers $E_A$ and $E_B$.

The information $I_A$ and $I_B$ may constitute a message. Thus, according to the invention, it is possible to initiate with a high degree of security even an anonymous dialogue between two individuals, provided these individuals belong to the same group (same secret set S).

The invention does not deal with the problem of proving the logical relationship between the card and its bearer, since it is known that the presentation of a personal enabling or identification code (PIN code) suffices to prove that he is its legitimate holder.

The invention is adapted for use not only between individuals, but also between systems, which enables it to be applied to relations between subscribers and an information retrieval service without requiring the latter to consult at each call the complete subscriber file, which may not even exist.

The invention permits the certification of the origin of an item of information which has been stored in advance in the card memory. In these conditions, the individual receiving this information has a good reason to believe in the authenticity of this information if the latter has been checked at the time it is written, particularly if written permanently into a protected area of the memory.

An important advantage of the invention is that is is not necessary to make two-way communication automatons inviolable by placing them in protected enclosures, which must be the case in many systems in order to enhance their security.

According to the invention, the comparators $CC_A$ and $CC_B$ are located in the automatons, but they can very well be built into the cards.

The cards of the same group must be prepared according to the same manufacturing plan (same mask, same control operation code).

We claim:

1. A method for certifying the origin of at least one item of information $I_A$ stored in the memory of a first electronic device $C_A$ controlled by an individual A, said information $I_A$, being specific to individual $A_M$ and being transmitted for certification to a second electronic device $C_B$ controlled by an individual B, said individual B being assigned at least one specific item of information $I_B$ which was previously stored into the memory $M_B$ of the second electronic device $C_B$; comprising the steps of:

(a) causing to be calculated within each device $C_A$, $C_B$ a result R calculated by the same predetermined secret algorithm f and taking account of the same predetermined secret set S and the same random number $E_B$ supplied by the second electronic device $C_B$; and (b) comparing within the second device $C_B$, the two results R, the agreement between said two results R certifying to individual B that the first device $C_A$ belongs to the same group as his device $C_B$ owing to the fact that the two devices contain the same secret set S and the same algorithm f;

(c) information retrieval service individual certifying the origin of the information $I_A$, causing the algorithm f to take account of a supplementary parameter J which, in turn, takes account of both items of information $I_A$, $I_B$, combined in accordance with the same predetermined secret algorithm p and exchanged between two devices $C_A$, $C_B$; and (d) causing the first device $C_A$ to calculate a result $R = f(E_B, S, J)$ with $J = p(I_A, I_B)$ and the second device to calculate a result $R = f(E_B, S, J)$ with $J = p(I_B, I_A)$, the algorithm p being symmetrical so that $J = p(I_A, I_B) = p(I_B, I_A)$ and thus certifying to (information retrieval service) individual B, in case of an agreement between said two results R, that the information $I_A$ has not been altered during its transfer from the first electronic device $C_A$, and that it comes solely from said first device $C_A$.

2. A method for the mutual identification of two individuals (A, B) belonging to the same organization, the individual A holding a first electronic device $C_A$ in the memory of which there is stored at least one item of information $I_A$ specific to individual A, individual B holding a second electronic device $C_B$ in the memory of which there is stored at least one item of information $I_B$ specific to individual B, comprising:

(a) causing to be calculated within each device $C_A$, $C_B$ a first result R calculated by the same predetermined secret algorithm f and taking account of the same predetermined secret set S and the same random number $E_B$ supplied by the second electronic device $C_B$, and (b) comparing within the second device $C_B$ the two results R, the agreement between said two results R certifying to individual B that the first device $C_A$ belongs to the same group as his device $C_B$ owing to the fact that both devices contain the same secret set S and the same algorithm f, (c) causing to be calculated within each device $C_A$, $C_B$ a second result R calculated by the same predetermined secret algorithm f and taking account of the same predetermined secret set S and the same random number $E_A$ supplied by the first electronic device $C_A$; and (d) comparing, within the first device $C_A$, the first and the second results R, the agreement between said two results R certifying to individual A that the second device $C_A$ belongs to the same group as his device $C_A$ owing to the fact that both devices contain the same secret set S and the same algorithm f; and (e) in order to enable individual B to be certain of the origin of the information $I_A$ causing the algorithm f to take account of a supplementary parameter J which, in turn, takes account of the two items of information $I_A$, $I_B$ combined according to the same predetermined secret algorithm p exchanged between the two devices $C_A$, $C_B$; and (f) causing the first device $C_A$ to calculate a result $R=f(E_B, S, J)$ with $J=p(I_A, I_B)$ and causing the second device to calculate a result $R=f(E_B, S, J)$ with $J=p(I_B, I_A)$, the algorithm p being symmetrical so that $J=p(I_A, I_B)=p(I_B, I_A)$, and thus certifying to individual B, in case of an agreement between said two results R, that the information $I_A$ has not been altered during its transfer from the first device $C_A$, and that it comes solely from said device $C_B$; and that, in order to enable individual A to be certain of the origin of the information $I_B$, (g) causing the algorithm f to take account of a supplementary parameter J which, in turn, takes account of both items of information $I_A$, $I_B$ combined according to the same predetermined secret algorithm and exchanged between both devices $C_A$, $C_B$; and thus causing the second device $C_B$ to calculate a result $R=f(E_A, S, J)$ with $J=p(I_A, I_B)$ and causing the first device $C_A$ to calculate a result $R=f(E_A, S, J)$ with $J=p(I_A, I_B)=p(I_B, I_A)$ and thus certifying to individual A, in case of an agreement between said two results R, that the information $I_B$ has not altered during its transfer from the second device $C_B$, and that it comes solely from said second device $C_B$.

3. The method according to claim 1 or 2, further including the step of taking as the aforesaid algorithm p a trap algorithm.

4. The method according to claim 1 or 2, further including the step of causing the aforesaid secret algorithm p to take account of a supplementary parameter $E_x$ which is a predetermined combination of the aforesaid two random numbers $E_A$ and $E_B$.

5. A system for certifying the origin of at least one item of information $I_A$ stored in the memory of a first electronic device $C_A$ controlled by an individual A, said information $I_A$, being specific to individual $A_M$ and being transmitted for certification to a second electronic device $C_B$ controlled by an individual B, said individual B being assigned at least one specific item of information $I_B$ which was previously stored into the memory $M_B$ of the second electronic device $C_B$ wherein said electronic devices ($C_A$, $C_B$) each include a portable, electronic card ($C_A$, $C_B$) each comprising at least:

one memory ($M_A$, $M_B$) having stored therein at least one item of information ($I_A$, $I_B$) which is to be identified, a secret set (S) and a predetermined secret algorithm f; control circuits ($T_A$, $T_B$) for operating on the algorithm f to provide a result (R); said cards ($C_A$, $C_B$) being respectively adapted for connection to two linkup automatons ($A_A$, $A_B$), which are adopted to be connected by a transmission channel (L), each automaton comprising at least one random number generator (GNA; GNB) and a comparator circuit (CCA, CCB) for comparing the results (R) calculated by the two cards ($C_A$, $C_B$).

6. The system according to claim 5, wherein the control circuit ($T_A$) of the card ($C_A$) is arranged to operate on the aforesaid algorithm f which takes account of the information ($I_A$) which is to be certified, the secret set (S), a random number ($E_B$) supplied by the aforesaid automaton ($A_B$) associated with the card ($C_B$), and a parameter (J) which, in turn, is related to the two items of information ($I_A$, $I_B$) combined in accordance with the aforesaid predetermined symmetrical algorithm p; and the control circuit ($T_B$) of the card ($C_B$) operate on the aforesaid algorithm which takes account of the information ($I_A$) which is to be certified, the secret set (S), the random number ($E_A$) which is at least related to the two items of information ($I_B$, $I_A$) combined according to the aforesaid predetermined symmetrical algorithm p; the comparator (CCB) being connected to both results of the processing circuits ($T_A$, $T_B$), such that agreement of said results certifies to individual B that the information $I_A$ indeed comes from the card $C_A$.

7. The system according to claim 6 wherein the control circuit ($T_A$) of the card ($C_A$) operates on the aforesaid algorithm f which takes account of the information ($I_B$) which is to be certified, the secret set (S) a random number ($E_A$) supplied by the automaton ($A_A$) associated with the card ($C_A$), and a parameter (J) which, in turn, is at least related to the two items of information ($I_A$, $I_B$) combined according to the aforesaid predetermined symmetrical algorithm p; and the control circuit ($T_B$) of the card ($C_B$) processes the aforesaid algorithm f which takes account of the information ($I_B$) which is to be certified, the secret set (S), the random number ($E_A$) which is at least related to both items of information ($I_A$, $I_B$) combined according to the aforesaid predetermined symmetrical algorithym p; the comparator (CCA) comparing both results of the processing circuits ($T_A$, $T_B$), such that agreement of said results certifies to individual A that the information $I_B$ indeed comes from the card $C_B$.

* * * * *